April 28, 1931.  N. R. CAMPBELL  1,803,000
MANUFACTURE OF PHOTOELECTRIC CELLS
Filed Jan. 3, 1929
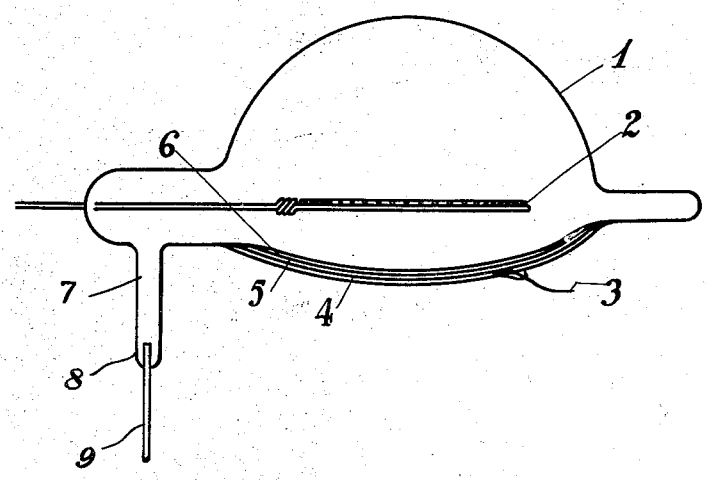
Inventor.
Norman R. Campbell
M. H. Lockwood
Attorney.

Patented Apr. 28, 1931

1,803,000

UNITED STATES PATENT OFFICE

NORMAN ROBERT CAMPBELL, OF WATFORD, ENGLAND

MANUFACTURE OF PHOTO-ELECTRIC CELLS

Application filed January 3, 1929, Serial No. 330,156, and in Great Britain January 7, 1928.

This invention relates to the manufacture of photoelectric cells of the kind which are highly sensitive to red light and in which the cathode is formed by depositing on a suitable metal electrode a very thin and normally invisible film of a photo-sensitive material, such as potassium, and sensitizing this film by the passage of an electric discharge in hydrogen through the cell. Such cells are described in the specification of my copending application for Letters Patent of the United States Serial No. 323,100, filed December 1, 1928.

Photoelectric cells of this kind may be filled with argon or other rare gas in the usual manner; but if they are so filled their red sensitivity is not permanent; it decays slowly even if no discharge is passed and very rapidly if a discharge is passed. A discharge through argon for a minute will almost completely destroy the red sensitivity.

According to the present invention, this difficulty can be overcome by filling the cells with hydrogen instead of a rare gas. The passage of a discharge through hydrogen will not destroy the red sensitivity or at least will not destroy it nearly so rapidly. Unfortunately however, it is well known that if a photoelectric cell is filled with hydrogen, the hydrogen will disappear slowly. It may be practicable to adjust the initial pressure of hydrogen so that, when the absorption is complete, the right amount of hydrogen is left in the cell; but a more suitable method of overcoming this difficulty is to attach to the cell in a known manner a palladium tube, through which hydrogen can be introduced by heating it in a flame of hydrogen or coal-gas. The pressure of the hydrogen should, of course, always be adjusted in a know manner so that the maximum amplification by ionization by collision is obtained.

Furthermore, in the manufacture of photoelectric cells of this kind the electrode on which the thin film of photosensitive material is deposited usually consists of silver. I have found that the sensitivity of the cell, and especially the red sensitivity, depends very greatly on the material of this electrode. Greater red sensitivity can be obtained if the electrode is of copper, but less sensitivity if it is of platinum. If it is of copper considerable red sensitivity can be obtained even before the final sensitization of the thin film; but the sensitization is improved by the passage of an electric discharge. The cells with a copper electrode are not only more red sensitive on the whole than those with a silver electrode, but their production is also less irregular; they are more stable and prolonged discharges in hydrogen produce no decrease in sensitivity.

The result obtained appears to depend somewhat on the exact manner in which the copper electrode is formed. Accordingly, by way of example, one manner of forming a copper electrode which will give good results is next described.

Any of the geometrical forms and electrode arrangements common in photoelectric cells may be used; for the purposes of the present example the form shown in sectional elevation in the accompanying drawing is adopted. As shown in the drawing, the cell consists of a glass vessel 1 containing an anode 2 constructed of wire gauze supported on a metal ring, a cathode lead 3 being sealed into the vessel 1 and pressing against the inner surface of the said vessel. Layers 4, 5 and 6, the thickness of which is shown greatly exaggerated for the sake of clarity, are deposited on the inside of the glass vessel 1, layer 6 forming the photosensitive cathode proper. The formation of these layers is described in greater detail below.

Towards one end thereof, the glass vessel 1 is provided with a side tube 7, into the end of which is sealed at 8 a thin walled palladium tube 9. Hydrogen is introduced into the glass vessel in known manner by heating the palladium tube in a flame of hydrogen or coal gas.

First the bottom of the cell is coated with a layer of silver 4 by means of the well-known silvering solution known as Brashear's. (See, for example, Glazebrook's Dictionary of Applied Physics, Volume IV, p. 676.) In order to obtain a thick layer it is well to do the silvering twice. The silvered coating is then washed, dried, and heated to 100° C. for about 15 minutes. The cell is now supported with the silvered surface vertical and filled with the coppering solution described below; a stout copper wire is introduced to serve as the anode and a current of about 2 milliamperes per sq. cm. passed through the solution for 15 minutes with the silver coating as cathode. The best results are obtained when the temperature, distance between anode and cathode, and current density are so adjusted that the resulting copper layer 5 is not "coppery", but a matt chocolate brown. The cell is then washed and dried; it is then baked for a few minutes while heated to about 300° C., so that the surface of the copper may be oxidized. The cell is then ready for the formation and sensitization of the potassium film which is performed as follows. Enough potassium must be introduced to coat the copper with a bright metallic layer, but not more than is necessary for this purpose should be introduced. The potassium is driven off and deposited on the walls by heating the bottom of the vessel, the surface of the cathode should be nearly black. Hydrogen is then admitted and a discharge passed until the red sensitivity is fully developed.

The copper solution used is a slight modification of that first described in 1846 by Elsner. Freshly precipitated copper carbonate is first prepared by adding a solution of 400 grams of crystallized copper sulphate in 2 litres of water to a solution of 100 grams of anhydrous potassium carbonate in 1 litre. The mixed solution is allowed to stand for one hour, after which the precipitate is filtered off and washed well with cold distilled water. Meanwhile 60 grams of acid potassium tartrate are dissolved in one litre of boiling water; to this is added gradually excess of the freshly precipitated copper carbonate; the excess will be precipitated in a flaky form. Care must be taken that excess is really added; for if the solution is cooled before there is excess, acid potassium tartrate will be thrown down as a fine powder, which might be mistaken for excess of the copper carbonate. The solution is now filtered and allowed to stand for some days during which it deposits a blue precipitate. This deposition may be hastened by electrolyzing with copper electrodes. When the deposition has ceased or become very slow, the solution is ready for use.

With the copper electrode, as with the silver, the greatest red sensitivities are obtained by using potassium rather than any other of the alkali metals. It is to be understood that the invention is not restricted to copper cathodes, because it is possible that cathodes other than copper, for example, electrodes of zinc, will give results as good as those on copper; but other metals are less easily used.

I claim:—

1. In the manufacture of photoelectric cells, the method which consists in depositing on a metal cathode therein a very thin and normally invisible film of photo-sensitive material, sensitizing this thin film by the passage of an electric discharge in hydrogen through the cell, and finally filling the said cell with hydrogen.

2. In the manufacture of photoelectric cells, the method which consists in coating a part of the interior of the cell with silver, coating the said silver with a copper surface, partially oxidizing the said copper surface, depositing a very thin and normally invisible film of photosensitive material on the oxidized copper surface, admitting hydrogen to the cell and passing an electric discharge until the red sensitivity is developed and finally adjusting the pressure of the hydrogen in the cell.

3. A photoelectric cell comprising a sealed envelope to which is attached a palladium tube, the said envelope containing an anode, a metal cathode coated with a very thin and normally invisible film of photosensitive material which has been rendered sensitive to red light, and a filling of hydrogen.

4. A photoelectric cell comprising a sealed envelope, an anode, a cathode comprising a surface coating of oxidized copper coated with a thin and normally invisible film of potassium, a filling of hydrogen, and means for adjusting the pressure of the said hydrogen.

5. A photoelectric cell comprising a sealed envelope, a palladium tube, an anode, a cathode comprising a surface coating of oxidized copper coated with a very thin red-sensitive film of photosensitive material and a filling of hydrogen.

NORMAN ROBERT CAMPBELL.